Nov. 18, 1952 LE ROY E. ENDICOTT 2,618,051
BOOT APPLICATOR FOR UNIVERSAL JOINTS
Filed Oct. 26, 1948 3 Sheets-Sheet 1
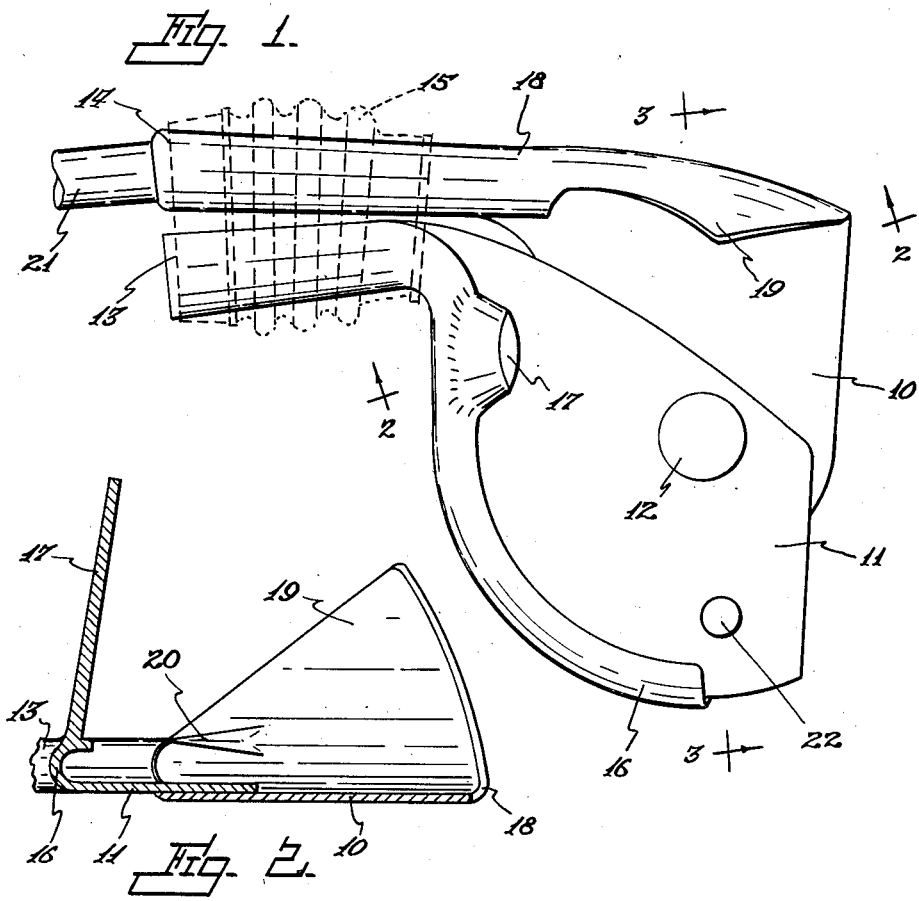
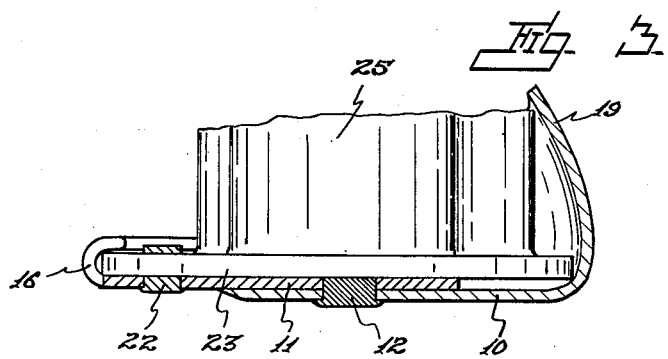
INVENTOR.
LeRoy E. Endicott
BY Nov. 18, 1952  LE ROY E. ENDICOTT  2,618,051
BOOT APPLICATOR FOR UNIVERSAL JOINTS
Filed Oct. 26, 1948  3 Sheets-Sheet 3

INVENTOR.
LeRoy E. Endicott
BY
Smith & Wells

Patented Nov. 18, 1952

2,618,051

UNITED STATES PATENT OFFICE 2,618,051

BOOT APPLICATOR FOR UNIVERSAL JOINTS

Le Roy E. Endicott, Pullman, Wash.

Application October 26, 1948, Serial No. 56,511

3 Claims. (Cl. 29—235)

The present invention relates to improvements in a boot applicator for universal joints.

The invention relates generally to universal joints such as are used at the ends of the transmission shaft in an automobile. Universal joints are provided at both ends of the transmission shaft and one elastic boot is used to prevent dirt and other foreign matter from entering the universal joint and to keep lubricant from escaping from the joint.

The elastic boot to which I refer and the way it fits the universal joint can be seen in the Hagerty Patent No. 2,308,073.

It has been the practice, so far as I am aware, to apply this boot by dismantling the universal joint. This is, of course, not difficult when the boot is applied at the time the universal joint is first assembled with the transmission shaft. However, when a boot must be replaced or applied in the place of the laced on type of covering, after the transmission shaft is assembled in the vehicle, the matter of taking the universal joint apart is very difficult.

It is the principal purpose of my invention to provide a simple tool whereby the boot may be applied to the universal joint without taking the joint apart or separating it from the shaft. The device is not limited to this particular use, but is applicable wherever it is essential to spread an elastic boot and force it over an enlarged head into the position it must ultimately occupy.

My invention contemplates an applicator of this character comprising two flanged plates pivoted together and having arms extending therefrom, in proximity to each other when the plates are in one position, and spreadable apart when the elastic boot is placed on the arms to expand the boot and pass it over the flanged plates, the plates having guide surfaces projecting from the flanges to direct the expanded boot axially of the pivot of the plates.

The nature and advantages of my invention will appear more fully from the following description and the accompanying drawings wherein a preferred form of the invention is shown. It should be understood however, that the drawings and description are illustrative only and are not to be considered as limiting the invention except insofar as it is limited by the claims.

In the drawings:

Figure 1 is a view in side elevation of the applicator with the boot shown thereon in dotted lines;

Figure 2 is a sectional view on the line 2—2 of Figure 1;

Figure 3 is a sectional view on the line 3—3 of Figure 1;

Figure 4:
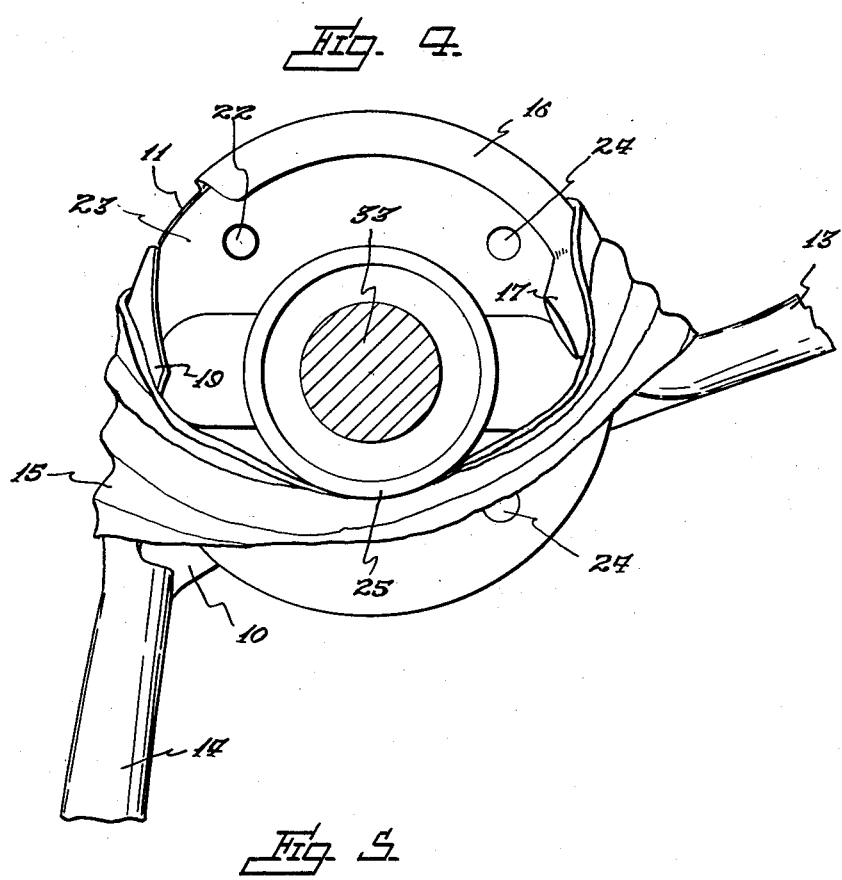
Figure 4 is a face view looking in the same direction as Figure 1 of the applicator showing a boot thereon partially spread over the flanged end of the universal joint.

Referring now to the drawings, the applicator which embodies my invention is formed of two sheet metal plates 10 and 11, which plates are hinged together by a pivot pin 12. The shape of the plates 10 and 11 is such as to provide for their turning about the pivot pin 12 to spread the arms 13 and 14 in order to stretch an elastic boot 15 and cause it to pass over the plates 10 and 11. The plate 11 has a flange 16 integral therewith and extending around the edg of the plate at a uniform distance from the center of the pivot pin 12, through slightly more than a quarter of circle. The flange then straightens and is bent over to form, with an extension of plate, the arm 13. Adjacent to the arm 13, the flange has an integral guide projection 17 thereon. The projection 17 is rounded and tapered as shown to a blunt end. The guide surface extends in an axial direction with respect to the pivot pin 12, approaching the axis of the pivot pin as it recedes from the flange 16.

The plate 10 is also flanged over as indicated at 18 to form a substantial V-shaped guide projection 19, which extends in the same direction as the projection 17 and which is curved to provide a convex guide surface. Inside the flange 18, a rib 20 is built up to cooperate with the flange 16 in holding the applicator on the flanged head of the universal joint. The plate 10 and the flange 18 are extended to form the arm 14 and a handle 21 is provided on the arm 14 to give the necessary leverage for the applicator.

The plate 11 has a pin 22 thereon positioned to engage in one of the mounting bolt holes on the flange of the universal joint. It will be obvious from Figures 3, 5, 6, and 7 that the universal joint to which the boot is applied has a substantially circular flanged end 23 which has bolt holes 24 for attaching it to a complementary flange on the driving or driven member to which the joint is to be attached. The flanged head 23 is integral with a shell portion 25 of the universal joint. The shell portion has a neck 26 over which the boot 15 is secured when it is in place. Inside the shell 25 two channels 27 and 28 are provided for ball members 29 and 30 that are carried on a pin 31 which in turn is secured in the head 32 of the transmission shaft 33. The transmission shaft has a shoulder at 34 with a surface 35 on which the boot 15 fits.

Figure 5:
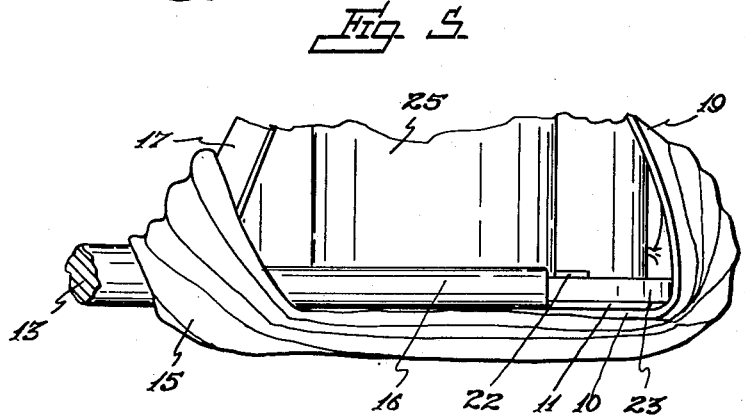
Figure 5 is an edge view of the applicator showing the advancing edge of the boot and the guide surfaces on the applicator as the boot approaches released position.
Figure 6:
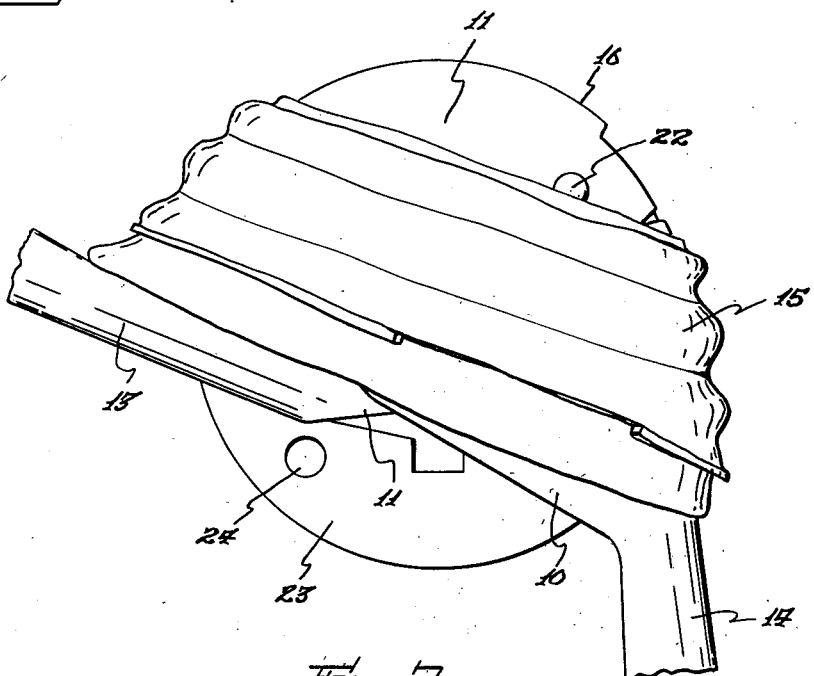
Figure 6 is a face view like Figure 4, but looking in the opposite direction.
Figure 7:
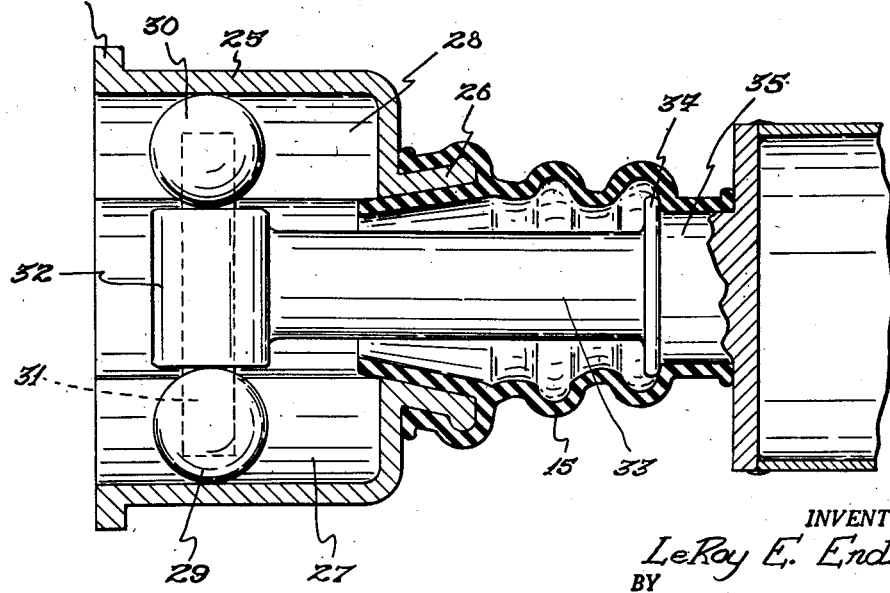
Figure 7 is a sectional view through the universal joint showing the boot in place.

In operation the applicator is first placed in the position shown in Figure 3 with the pin 22 inserted in one of the apertures 34 of the flanged end 23. The arms 13 and 14 have to be spread apart so that the flanges 16 and 18 engage over the flanged end 23. The arms 13 and 14 are then brought together and the boot 15 is placed over them as indicated by the dotted lines in Figure 1. The transmission shaft is mounted in a vice or otherwise held against movement and the arms 13 and 14 are spread apart by applying pressure to the handle 21. As the arms spread they force the boot down against the back surfaces of the plates 10 and 11 and the outer surface of the projections 17 and 19. These projections start the advancing end of the boot 15 toward its ultimate position. As the spreading of the arms 13 and 14 continues, the boot is stretched as indicated in Figures 4, 5 and 6 until finally it slides over the flanged end 23 when the resilience thereof will cause it to move lengthwise over the shell 25 and onto the shaft 33. It is then a simple matter to fit the flanges at the ends of the boot around the portions 26 and 35 and the boot is in place.

The universal joint is, of course, cleaned and filled with grease before applying the boot and can be completely packed with grease after the boot is in place. The boot itself and the surface of the applicator are also greased before the boot is stretched in order that the parts will slip easily. All of the outer surface of the applicator with which the boot comes in contact are smoothed off and preferably polished so that the boot will slip readily.

Having thus described my invention, I claim:

1. An applicator tool for expanding and moving an elastic boot over a flanged head of a universal joint, said tool comprising two plates having portions thereof overlapped, pivot means pivotally connecting the overlapped portions, each plate having a laterally extending peripheral flange spaced outwardly from the pivot means, the flanges on said plates being curved inward toward each other to seat over the flanged head of a universal joint, an arm on each plate extending outwardly from the flange thereon, the arms being movable into proximity to each other by rotation of one plate on the other plate to pass through an elastic boot together, whereby spreading the arms will expand the boot over the flanges and the flanged head.

2. An applicator tool for expanding and moving an elastic boot over a flanged head of a universal joint, said tool comprising two plates having portions thereof overlapped, pivot means pivotally connecting the overlapped portions, each plate having a laterally extending peripheral flange spaced outwardly from the pivot means, the flanges on said plates being curved inward toward each other to seat over the flanged head of a universal joint, the flanges on said plates having tapered guide projections extending away from the plate and toward the axis of said pivot means, an arm on each plate extending outwardly from the flange thereon, the arms being movable into proximity to each other by rotation of one plate on the other plate to pass through an elastic boot together, whereby spreading the arms will expand the boot over the flanges and the flanged head.

3. An applicator tool for expanding and moving an elastic boot over a flanged head of a universal joint, said tool comprising two plates having portions thereof overlapped, pivot means pivotally connecting the overlapped portions, each plate having a laterally extending peripheral flange spaced outwardly from the pivot means, the flanges on said plates being curved inward toward each other to seat over the flanged head of a universal joint, one of said plates having a pin projecting laterally therefrom adjacent to the flange thereon for engaging an aperture in the flanged head, said flanges having tapered guide projections extending away from the plate and toward the axis of said pivot means, an arm on each plate extending outwardly from the flange thereon, the arms being movable into proximity to each other by rotation of one plate on the other plate to pass through an elastic boot together, whereby spreading the arms will expand the boot over the flanges and the flanged head.

LE ROY E. ENDICOTT.

REFERENCES CITED

The following references are of record in the file of this patent:

UNITED STATES PATENTS

| Number | Name | Date |
|---|---|---|
| 2,166,089 | Brenner | July 11, 1939 |
| 2,271,064 | Dolph | Jan. 27, 1942 |
| 2,371,570 | Worel | Mar. 13, 1945 |
| 2,441,696 | Feingold | May 18, 1949 |